(12) United States Patent
Paini et al.

(10) Patent No.: US 12,107,719 B2
(45) Date of Patent: Oct. 1, 2024

(54) INTELLIGENT REAL-TIME INTERNET-OF-THINGS ALERT

(71) Applicant: Bank of America Corporation, Charlotte, NC (US)

(72) Inventors: Siva Kumar Paini, Hyderabad Telangana (IN); Sudhakar Balu, Chennai (IN); Anup Kumar Kedia, Hyderabad Telangana (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/974,734

(22) Filed: Oct. 27, 2022

(65) Prior Publication Data
US 2024/0146601 A1    May 2, 2024

(51) Int. Cl.
*H04L 41/069* (2022.01)
*H04L 41/16* (2022.01)
*H04L 41/22* (2022.01)
*H04L 67/12* (2022.01)

(52) U.S. Cl.
CPC ........... *H04L 41/069* (2013.01); *H04L 41/16* (2013.01); *H04L 41/22* (2013.01); *H04L 67/12* (2013.01)

(58) Field of Classification Search
CPC ....... H04L 41/069; H04L 41/16; H04L 41/22; H04L 67/12; H04L 41/0654; H04L 41/0663; H04L 41/507
See application file for complete search history.

(56) References Cited

U.S. PATENT DOCUMENTS

| | | | |
|---|---|---|---|
| 8,161,330 B1* | 4/2012 | Vannatter | G07F 19/207 714/48 |
| 10,802,843 B1* | 10/2020 | Carrigan | G06F 21/32 |
| 10,824,145 B1* | 11/2020 | Konrardy | G08G 1/146 |
| 10,924,376 B2* | 2/2021 | Bhaya | G06F 16/3344 |
| 11,296,971 B1* | 4/2022 | Jain | H04L 41/12 |
| 11,837,348 B2* | 12/2023 | Davis | A61B 5/14517 |
| 2017/0048343 A1* | 2/2017 | Arabo | H04L 67/61 |
| 2019/0182329 A1* | 6/2019 | Moss | G06N 20/00 |
| 2020/0184355 A1* | 6/2020 | Mehta | G06F 11/3476 |
| 2020/0306970 A1 | 10/2020 | Latkar et al. | |
| 2021/0067607 A1* | 3/2021 | Gardner | H04L 41/082 |
| 2022/0100594 A1* | 3/2022 | Pal | G06F 11/0709 |
| 2022/0357940 A1* | 11/2022 | Crane | G06F 11/3089 |
| 2023/0251854 A1* | 8/2023 | Jayapathi | H04L 67/561 717/122 |
| 2023/0370338 A1* | 11/2023 | Shori | H04L 41/147 |

* cited by examiner

*Primary Examiner* — Javier O Guzman
(74) *Attorney, Agent, or Firm* — Weiss & Arons LLP

(57) ABSTRACT

Apparatus and methods for intelligently monitoring multiple bots for failure or predicted failure and notifying a user through a proximate Internet-of-Things ("IoT") device are provided. A program may receive configuration files for each IoT device and access to monitor each bot. The program may monitor each bot through a resiliency scanner module. The program may generate a report about a failure or predicted failure of a bot. The program may activate a self-healing engine to attempt to heal the bot. The program may activate an event-stream engine. The event-stream engine may determine which IoT device to transmit a report and notify the user through that IoT device to the failure or predicted failure. The user may respond through the IoT device or another device.

19 Claims, 6 Drawing Sheets

INTELLIGENT REAL-TIME INTERNET-OF-THINGS ALERT

FIELD OF TECHNOLOGY

Aspects of the disclosure relate to providing apparatus and methods to intelligently provide real-time alerts through Internet-of-things ("IoT") devices.

BACKGROUND OF THE DISCLOSURE

Large entities (and others) may run hundreds or thousands of automated computer bots (and scripts) every day. These bots may automate all sorts of processes. Many of these bots are relatively unsophisticated and simple. These bots may not effectively respond to unanticipated problems and many issues may not be anticipated by the bots' programmers.

Often the bots may fault or get interrupted due to various issues such as configurations, environment, server issues, system upgrades, patches, or application conflicts, as well as other issues. The bots may report the issue within a log that is transmitted to a server or elsewhere. However, a system administrator may not be looking into the logs at the time of the fault and cannot take appropriate action at the time a fault is reported. In addition, a bot may be running repeatedly or for more (or less) than an anticipated time, which may be unusual activity for that particular bot. These issues may occur outside of normal business hours. These issues may decrease the effectiveness of bots as well as create business or business interruption issues.

System administrators may not have available access to the bots at the time of an issue or issues, delaying an appropriate response which may cause productivity, financial, or other issues. However, many system administrators may be nearby to or carrying a networked device (such as a smartphone, or an Internet of Things ("IoT") connected appliance) at the time of an issue.

Currently, there is no apparatus or method available to intelligently alert system administrators to bot issues through an IoT or other device.

Therefore, it would be desirable for apparatus and methods to intelligently provide real-time alerts of bot issues to system administrators and others through "IoT" devices.

SUMMARY OF THE DISCLOSURE

It is an object of this disclosure to provide apparatus and methods to intelligently provide real-time alerts of bot issues to system administrators and others through "IoT" devices.

An intelligent real-time bot monitoring and notification computer program product is provided. The computer program product may include executable instructions. The executable instructions may be stored on non-transitory memory and may be executed by a processor on a computer system.

The program may receive one or more configuration files from a user, another program, another computer, or elsewhere. Each configuration file may include instructions on how the program should communicate with a particular Internet-of-Things ("IoT") device belonging to the user.

The program may receive access to one or more bots running on a server. The program may be located on the same server or a different server.

The program may include a resiliency scanner module. The resiliency scanner module may monitor each of the one or more bots and detect a failure in one or more of the one or more bots.

When the computer program product, through the scanner module, detects that one of the one or more bots has failed, the program may generate a report about the failure of the one of the one or more bots. The program may also activate a self-healing engine. The self-healing engine may be configured to repair or attempt to repair the one of the one or more bots that has failed. The self-healing engine may analyze the failure or predicted failure and determine, through one or more artificial intelligence/machine learning ("AI/ML") algorithms, a possible repair to the failure. The self-healing engine may then implement that possible repair.

The program may also activate an event-stream engine in response to a bot failure or predicted failure. The event-stream engine may receive the report about the failure. The engine may analyze the situation and determine which IoT device belonging to the user and identified in the configuration files is near the user at the time the report is received.

The event-stream engine may create a notification formatted for the IoT device that is near the user and transmit the notification to the IoT device.

In an embodiment, the computer program product may determine that one of the one or more bots is exceeding an expected runtime. The program (i.e., its executable instructions) may generate a report about the one of the one or more bots exceeding (or finishing too quickly) its expected runtime. Exceeding (or completing too early) may be indicative of a failure.

The program may activate the self-healing engine. The self-healing engine may determine, through the same or different AI/ML algorithms, a possible solution to the one of the one or more bots exceeding (or completing before) its expected runtime.

The program may also activate the event-stream engine. The event-stream engine may receive the report, determine which IoT device belonging to the user is near the user, create a notification formatted for the IoT device near the user, and transmit the notification to the IoT device.

In an embodiment, when the computer program product may determine that one of the one or more bots is performing as expected, with no failures of any type. The program may simply continue monitoring the one of the one or more bots.

In an embodiment, the resiliency scanner module may predict, through one or more AI/ML algorithms, that one of the one or more bots will experience a predicted failure, even if it has not failed yet.

In an embodiment, when the resiliency scanner module predicts that one of the one or more bots will experience a predicted failure, the program (i.e., its executable instructions) may generate a report about the predicted failure. The program may activate the self-healing engine. The self-healing engine may determine, through one or more AI/ML algorithms, a possible solution to the predicted failure of the one of the one or more bots. The self-healing engine may attempt and implement the possible solution.

The program may also activate the event-stream engine. The event-stream engine may receive the report, determine which IoT device belonging to the user is near the user, create a notification formatted for the IoT device near the user, and transmit the notification to the IoT device.

In an embodiment, the user may respond to the notification by providing a user response. The user may respond to the notification by providing the user response through the IoT device or through a different device. In an embodiment, the notification may provide a method or ability for the user to respond.

In an embodiment, the user may respond to the notification by instructing the program to:
1) terminate the instance of the failed bot;
2) restart the failed bot;
3) restart the entire server;
4) start a different bot; or
5) a combination of two or more of 1)-4).

In an embodiment, the program may log and record the user response, the report, the bot failure or predicted failure, and other information.

In an embodiment, the event-stream engine may re-transmit the notification at pre-determined intervals until the user acknowledges the notification. For example, until the user responds, the event-stream engine may re-transmit the notification every five minutes.

In an embodiment, when the user does not acknowledge or respond to a notification within a pre-determined amount of time, the event-stream engine may determine that a different IoT device is near the user and transmit an appropriate notification to that different IoT device. This process may be repeated for all possible IoT devices belonging to the user until the user responds.

In an embodiment, the notification may include one or more videos.

In an embodiment, the notification may include one or more log reports.

In an embodiment, the event-stream engine may also create and record an incident ticket.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
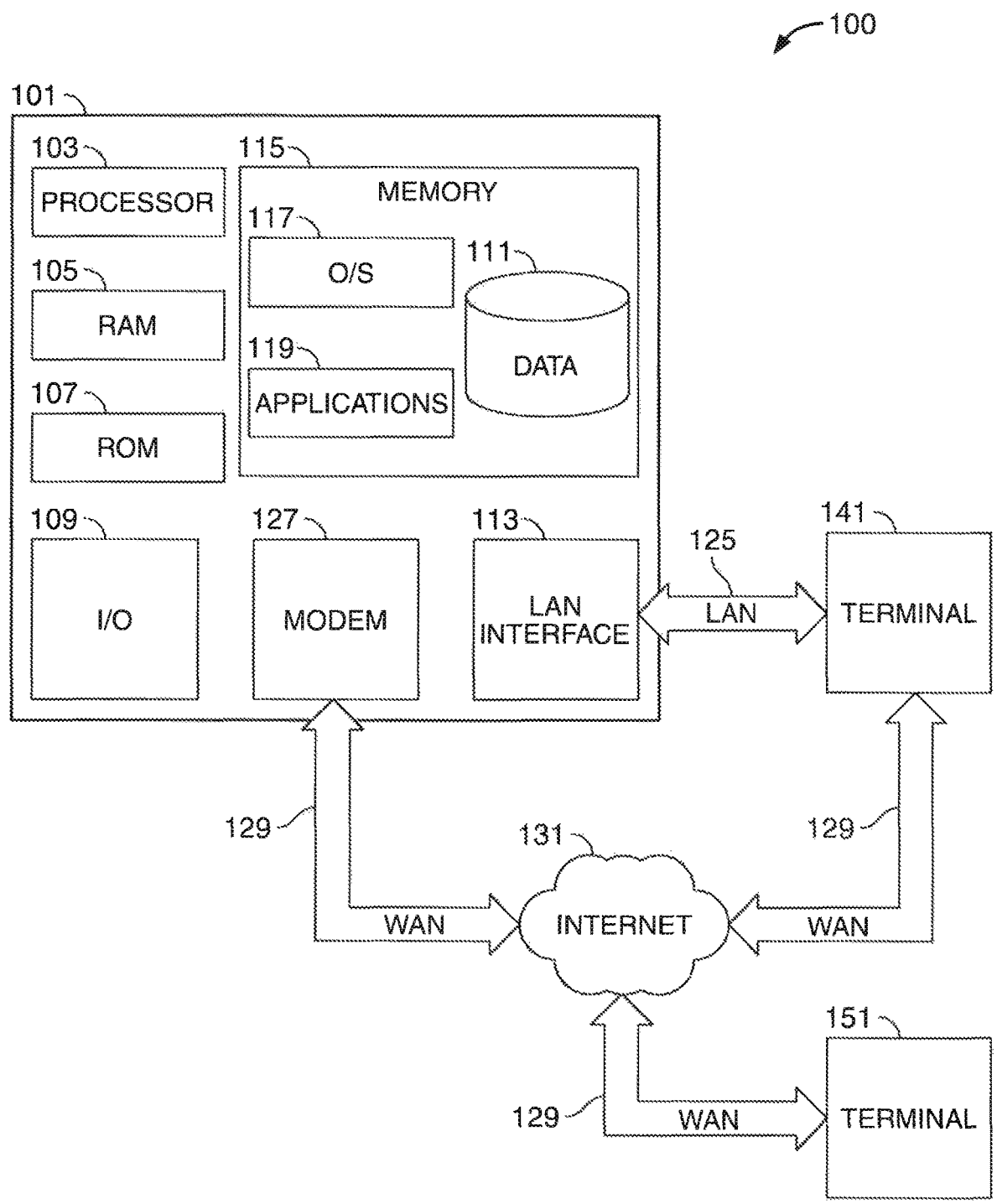
FIG. 1 shows an illustrative apparatus in accordance with principles of the disclosure.

It is an object of this disclosure to provide apparatus and methods for intelligently monitoring multiple bots and notifying a user or system administrator through an Internet-of-Things ("IoT") device.

An intelligent real-time bot monitoring and notification computer program product is provided. The computer program product may include executable instructions. The executable instructions may be stored on non-transitory memory and may be executed by a processor on a computer system.

Multiple processors may increase the speed and capability of the program. The executable instructions may be stored in non-transitory memory on the computer system or a remote computer system, such as a server.

Other standard components of a computer system may be present. The computer system may be a server, mobile device, or other type of computer system. A server or more powerful computer may increase the speed at which the computer program may run. Portable computing devices, such as a smartphone, may increase the portability and usability of the computer program, but may not be as secure or as powerful as a server or desktop computer.

The term "non-transitory memory," as used in this disclosure, is a limitation of the medium itself, i.e., it is a tangible medium and not a signal, as opposed to a limitation on data storage types (e.g., RAM vs. ROM). "Non-transitory memory" may include both RAM and ROM, as well as other types of memory.

The computer may include a communication link, a processor or processors, and a non-transitory memory configured to store executable data configured to run on the processor, among other components. The executable data may include an operating system and the transaction classifying computer program.

A processor(s) may control the operation of the apparatus and its components, which may include RAM, ROM, an input/output module, and other memory. The microprocessor may also execute all software running on the apparatus. Other components commonly used for computers, such as EEPROM or Flash memory or any other suitable components, may also be part of the apparatus.

A communication link may enable communication with other computers as well as any server or servers. The communication link may include any necessary hardware (e.g., antennae) and software to control the link. Any appropriate communication link may be used. In an embodiment, the network used may be the Internet. In another embodiment, the network may be an internal intranet.

The computer system may be a server. The computer program may be run on a smart mobile device. The computer program, or portions of the computer program may be linked to other computers or servers running the computer program. The server or servers may be centralized or distributed. Centralized servers may be more powerful and secure than distributed servers but may also be more expensive.

The program may receive one or more configuration files from a user, another program, another computer, or elsewhere. Each configuration file may include instructions on how the program should communicate with a particular Internet-of-Things ("IoT") device belonging to the user. Configuration files may simply be data files. Configuration files may be in any appropriate format. Configuration files, with appropriate data, may permit the program to communicate with particular devices, as well as inform the program of the existence of those devices.

Each configuration file may be provided by the user. Each configuration file may include information on a particular IoT device, including identity, location, when it is typically used, as well as technical data such as IP and MAC addresses.

In an embodiment, once the program is informed of the identity of a particular device, the program may search a repository, such as the Internet, for information on how to create and program a message for that particular device.

An IoT may include sensors, smart devices, as well as personal computers that are connected to a network. They may monitor the environment, gather data, as well as enable a user to connect to the Internet or other network through the device. Such IoT devices may be a smartphone, a tablet, smart-glasses, other portable computer, lights, speakers, appliances (such as refrigerators), smartwatches, vehicles, thermostats, gateway devices, sensors, doorbells, smart clothes, and other devices.

IoT devices may gather data, present data to a user, and act as a gateway for a user to ask questions and interact with the Internet or other network.

The program may receive access to one or more bots running on a server. The access may be provided by another program or a system administrator. The access may allow the program to monitor the performance and functionality of each of the one or more bots. The access may permit the program to control or modify each of the one or more bots. The access may include root-level access. The access may include administrator-level access and permissions.

The program may be located on the same server or a different server than the bots. The bots may be located on multiple servers in multiple locations. The bots may be accessible through the Internet or other, internal network.

The program may include a resiliency scanner module. The resiliency scanner module may be distributed across two or more servers. The resiliency scanner module may monitor each of the one or more bots and detect a failure in one or more of the one or more bots. The resiliency scanner module may scan the performance and activity of each of the one or more bots at pre-determined intervals, such as e.g., every second or every minute.

In an embodiment, the resiliency scanner module may monitor each bot continuously.

The resiliency scanner module may be configured to detect anomalies for each bot, and each bot may have different parameters for anomalies. For example, the scanner module may detect whether a bot is taking too long to complete a task, completed a task in an inordinately short amount of time, whether the bot has stopped working completely, or whether the bot is likely to fail at a future time. Each of these scenarios, as well as other scenarios, may be considered a bot failure. The reasons for a failure may be varied, and may include, inter alia, system configurations, environmental conditions, and corrupted data.

The resiliency scanner module may include a decision tree model. The decision tree model may analyze each bot and determine if the bot has failed, or is likely to fail due to historical patterns, data usage, and other information. The decision tree model may analyze all aspects of a bot and its current usage (memory usage, processor cycles, features, goals, etc.) along with historical data from that bot and other similar bots. The decision tree model may utilize AI/ML algorithm(s) to make its predictions and refine its predictions. Any suitable AI/ML may be used.

When the computer program product, through the scanner module detects that one of the one or more bots has failed, the program may generate a report about the failure of the one of the one or more bots. Failures may include any failure mode applicable to that particular bot, and each separate bot may have different or unique failure parameters.

The report may include various information. The information may include, inter alia, the identity of the bot, the location of the bot (physical and network locations), the nature of the bot, the nature of the failure or predicted failure, possible remediation steps, a log of actions taken by the program or the bot, a logfile of the bot, a logfile of the failure, an audiovisual representation of the bot or failure, and other information.

The program may also activate a self-healing engine. The self-healing engine may be located on the same system as the program or it may be distributed across one or more other servers. Distributing the various parts of the program across multiple servers may increase the processing power and speed of the program.

The self-healing engine may be configured to automatically repair or attempt to repair the one of the one or more bots that has failed or is predicted to fail. In an embodiment, the self-healing engine may be authorized to attempt a repair by the user or other system administrator.

The self-healing engine may attempt one or more repair attempts. Repair attempts may include restarting the bot server, restarting the bot, assigning more resources to the bot (e.g., more memory or CPU cycles), rerouting the memory, or other repairs.

The self-healing engine may analyze the failure or predicted failure and determine, through one or more artificial intelligence/machine learning ("AI/ML") algorithms, a possible repair to the failure. Any suitable AI/ML algorithm may be used. The algorithm may look at past issues with the bot or similar bots as well as any past repairs that were successful or unsuccessful. The algorithm may also look at potential repair possibilities (i.e., some repairs may be unavailable due to lack of correct access or privileges, or other bots are successfully running on the server and restarting the server will interrupt successfully running bots) to determine the repair(s) with the highest likelihood of success. The threshold of likely success may be varied or variable. The self-healing engine may then implement that possible repair.

The program may also activate an event-stream engine in response to a bot failure or predicted failure. The event-stream engine may be located on the same server as the program or may be distributed across multiple other servers.

The event-stream engine may receive the report about the failure. The engine may analyze the report and situation. The event-stream engine may determine which IoT device belonging to the user and identified in the configuration files is near the user at the time the report is received. One way of determining which IoT device is near the user is by determining the time and analyzing the configuration files to see which IoT devices are normally active by the user at that time. For example, if it is 9:00 p.m. and the user's smart-TV is active most nights at 9:00 p.m., the event-stream engine may determine that the IoT device with the highest likelihood of reaching the user will be the user's smart-TV. In general, a smartphone or smartwatch may be the most common IoT device determined to be near the user by the event-stream engine.

In an embodiment, the user may set which IoT device or devices the event-stream engine should use at a particular time. For example, when providing the configuration files, the user may include an instruction to notify the user's smartphone between 5:00 p.m. and 9:00 p.m., and the user's smart-TV between 9:00 p.m. and 11:00 p.m., and the user's smart alarm clock between 11:00 p.m. and 6:00 a.m.

The event-stream engine may create a notification formatted for the IoT device that is near the user and transmit the notification to the IoT device. Each separate IoT device may have disparate requirements on how a notification should be formatted to display or output the notification on a particular device.

The notification may include log files. The notification may be audiovisual. The notification may include videos or video clips. The videos may include the code behind the bot or a video of a running log file so that a user may visually see what occurred or will occur with the bot.

In an embodiment, the computer program product may determine that the failure is one of the one or more bots exceeding an expected runtime or finishing a run earlier than expected. The program may generate a report about the one of the one or more bots exceeding (or finishing too quickly) its expected runtime. Exceeding (or completing too early) may be indicative of a failure. For example, a bot finishing a run too quickly may indicate that the bot is not performing all of its functions as expected.

The program may activate the self-healing engine. The self-healing engine may determine, through the same or different AI/ML algorithm(s), a possible solution to the one of the one or more bots exceeding (or completing before) its expected runtime. For example, a possible solution to a both finishing a run early may be to check if the bot has access to all of the necessary data to run, and if not, provide access to the data.

The program may also activate the event-stream engine. The event-stream engine may receive the report, determine which IoT device belonging to the user is near the user, create a notification formatted for the IoT device near the user, and transmit the notification to the IoT device. The notification may be transmitted whether the self-healing engine is able to repair the bot.

In an embodiment, when the computer program product may determine that one of the one or more bots is performing as expected, with no failures of any type. The program may continue monitoring the one of the one or more bots. If no failure has occurred or is predicted to occur, there is no need for a notification to be transmitted to the user.

In an embodiment, the resiliency scanner module may predict, through one or more AI/ML algorithms, that one of the one or more bots will experience a predicted failure, even if it has not failed yet. Any suitable AI/ML algorithm or combination of algorithms may be used. The algorithm(s) may analyze the metadata, the latency, the code, the features, the runtime, the history, and other aspects of the bot to predict a failure. For example, the AI/ML algorithm may analyze the behavior of a bot and compare it to past behavior of the bot (including ideal runs as well as past failures). If the current behavior of the bot is similar to the behavior of the bot in a past failure, the algorithm(s) may determine that the bot is likely to fail. The determination of predicted failure may include a predicted time to failure.

In an embodiment, when the resiliency scanner module predicts that one of the one or more bots will experience a predicted failure, the program (i.e., its executable instructions) may generate a report about the predicted failure. The program may activate the self-healing engine. The self-healing engine may determine, through one or more AI/ML algorithms, a possible solution to the predicted failure of the one of the one or more bots. The self-healing engine may attempt and implement the possible solution.

In an embodiment, when the self-healing engine's repair attempt is successful, no notification is transmitted to the user. In another embodiment, even when the self-healing engine's repair attempt is successful, a notification is transmitted to the user.

The program may also activate the event-stream engine. The event-stream engine may receive the report, determine which IoT device belonging to the user is near the user, create a notification formatted for the IoT device near the user, and transmit the notification to the IoT device.

In an embodiment, the user may respond to the notification by providing a user response. In an embodiment, the user may respond to the notification by doing nothing.

The user response may include an acknowledgment of the notification. The user response may include an action for the program to perform. The user response may be text, voice, and/or mechanical (i.e., pushing one or more real or virtual buttons). The user response may be converted to machine-readable data.

The user may respond to the notification by providing the user response through the IoT device on which the notification was received or through a different device.

In an embodiment, the notification may provide a method or ability for the user to respond. For example, the notification may state: "press this button to do action A," or "state X to perform action 1," etc. In other embodiments, the user may be required to log into a network or account to perform certain actions, including responding to the notification. Different response methods may be used for various bots and may depend on the security level required.

The user may be required to authenticate to respond to the notification. Any suitable authentication protocol or protocols may be used.

In an embodiment, the user may respond to the notification by instructing the program to, inter alia:
1) terminate the instance of the failed bot;
2) restart the failed bot;
3) restart the entire server;
4) start a different bot;
5) provide additional information, including logs or videos; or
6) a combination of two or more of 1)-5).

Other responses may be submitted as well, such as the user submitting revised code to fix the bot, the user resubmitting data to the bot (if, e.g., the data was corrupted and the corrupted data caused the issue with the bot), as well as other appropriate responses.

In an embodiment, the program may log and record the user response, the report, the bot failure or predicted failure, and other information. The logs may be incorporated into a database for future analysis as well as a historical record.

In an embodiment, the logs and other information may be recorded in a distributed ledger/blockchain database. A distributed ledger may have an advantage of being immutable/unchangeable and the recorded information may not be tampered with.

In an embodiment, the event-stream engine may re-transmit the notification at pre-determined intervals until the user acknowledges the notification. For example, until the user responds, the event-stream engine may re-transmit the notification every five minutes. In an embodiment, the event-stream engine may automatically determine the interval. In an embodiment, the event-stream engine may automatically determine which failure may require an acknowledgment and which bot failure may not require an acknowledgment. For example, a bot failing by completing tasks too quickly may not require an acknowledgment, while a bot failing by freezing an entire server may demand an acknowledgement. The more serious a failure, the shorter the pre-determined intervals may be.

In an embodiment, when the user does not acknowledge or respond to a notification within a pre-determined amount of time, the event-stream engine may determine that a different IoT device could be near the user and transmit an appropriate notification to that different IoT device. This process may be repeated for all possible IoT devices belonging to the user until the user responds. In an embodiment, the event-stream engine may automatically determine the amount of time before switching notifications to a different IoT device.

In an embodiment, the event-stream engine may automatically determine which failure may require a device switch and which bot failure may not require a device switch. For example, a bot failing by completing tasks too quickly may not require an acknowledgment or device switch, while a bot failing by freezing an entire server may demand an acknowledgement and device switch as soon as possible. The more serious a failure, the shorter the predetermined intervals may be.

In an embodiment, the event-stream engine may generate and transmit notifications to two or more IoT devices. In an embodiment, transmitting notifications through two or more IoT devices may be reserved for more serious bot failures. The program may automatically determine how serious (or not serious) a bot failure is or may be, depending on various factors, including the bot and the nature of the failure.

In an embodiment, the notification may include one or more videos. In an embodiment, the notification may include one or more log reports. The notification may include any information necessary to inform the user of the bot failure or predicted failure, as well as provide the necessary information for the user to respond appropriately. The information may include a video of the bot failure (e.g., a screen of running code that freezes at a particular line of code).

In an embodiment, the event-stream engine may also create and record an incident ticket. The ticket may be used to track the bot failure as well as any response to the failure. The ticket may be used for analysis and auditing purposes. The ticket may be used to help train the program for future analysis and bot monitoring and healing.

An apparatus for intelligent real-time bot monitoring and notification is provided. The apparatus may include a central server. The central server may include a communication link, a processor, and a non-transitory memory. The memory may be configured to store an operating system and a real-time bot monitoring and notification application, among other applications.

The apparatus may include one or more Internet-of-Things ("IoT") devices belonging to a user. Each IoT device may include an IoT communication link among other components.

The application may include a resiliency scanner module, a self-healing engine, and an event-stream engine among other modules.

The resiliency scanner module may be configured to monitor one or more bots for failure.

The self-healing engine may be configured to determine, through one or more artificial intelligence/machine learning ("AI/ML") algorithms, a possible repair to a failure of one of the one or more bots, and apply the possible repair to the one of the one or more bots that has failed.

The event-stream engine may be configured to determine which one of the one or more IoT devices belonging to the user is near the user when the resiliency scanner module determines that one of the one or more bots has failed. The event-stream engine may also create a notification formatted for the near IoT device and transmit the notification to the IoT device.

In various embodiments, the failure may include the one of the one or more bots exceeding an expected runtime or finishing more quickly than expected. The failure may include the resiliency scanner module predicting, through one or more AI/ML algorithms, that one of the one or more bots will fail at a particular time, even if it has not failed yet.

In an embodiment, the user may respond to the notification through the near IoT device or through another device.

A method for intelligent real-time bot monitoring and notification is provided. The method may include the step of receiving, by an intelligent real-time bot monitoring and notification computer program on a centralized server, one or more configuration files. Each configuration file may include instructions on how the program can communicate with an Internet-of-Things ("IoT") device belonging to a user.

The method may include the step of receiving, by the program, access to one or more bots running on the server or a different server.

The method may include the step of monitoring, through a resiliency scanner module of the program, each of the one or more bots.

When the program detects that one of the one or more bots has failed, the method may include the steps of generating a report about the failure of the one or more bots, activating a self-healing engine of the program which may be configured to repair the one of the one or more bots, and activating an event-stream engine on the program.

The self-healing engine may determine, through one or more artificial intelligence/machine learning ("AI/ML") algorithms, a possible solution to the failure of the one of the one or more bots and implement/attempt the possible solution.

The event-stream engine may receive the report, determine which IoT device belonging to the user is near the user, create a notification formatted for the IoT device near the user, and transmit the notification to the IoT device.

In an embodiment, the user may be a system administrator.

In an embodiment, the method may include the step of the user responding to the notification, through the IoT device or through a different device.

In an embodiment, the failure of the one of the one or more bots may include:
1) the one of the one or more bots exceeding an expected runtime;
2) the resiliency scanner module predicting, through one or more AI/ML algorithms, that one of the one or more bots will fail at a particular time;
3) the one of the one or more bots has ceased to function in an expected manner; or
4) a combination of two or more of 1)-3) or other failures.

One of ordinary skill in the art will appreciate that the steps shown and described herein may be performed in other than the recited order and that one or more steps illustrated may be optional. Apparatus and methods may involve the use of any suitable combination of elements, components, method steps, computer-executable instructions, or computer-readable data structures disclosed herein.

Illustrative embodiments of apparatus and methods in accordance with the principles of the invention will now be described with reference to the accompanying drawings, which form a part hereof. It is to be understood that other embodiments may be utilized, and that structural, functional, and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

In accordance with principles of the disclosure, FIG. 1 shows an illustrative block diagram of apparatus 100 that includes a computer 101. Computer 101 may alternatively be referred to herein as a "computing device." Elements of apparatus 100, including computer 101, may be used to implement various aspects of the apparatus and methods disclosed herein. A "user" of apparatus 100 or computer 101 may include other computer systems or servers or computing devices, such as the program described herein.

Computer 101 may have one or more processors/microprocessors 103 for controlling the operation of the device and its associated components, and may include RAM 105, ROM 107, input/output module 109, and a memory 115. The microprocessors 103 may also execute all software running on the computer 101—e.g., the operating system 117 and applications 119 such as an intelligent bot monitoring and IoT notification program and security protocols. Other components commonly used for computers, such as EEPROM or Flash memory or any other suitable components, may also be part of the computer 101.

The memory 115 may be comprised of any suitable permanent storage technology—e.g., a hard drive or other non-transitory memory. The ROM 107 and RAM 105 may be included as all or part of memory 115. The memory 115 may store software including the operating system 117 and application(s) 119 (such as an intelligent bot monitoring and IoT notification program and security protocols) along with any other data 111 (historical bot data, configuration files) needed for the operation of the apparatus 100. Memory 115 may also store applications and data. Alternatively, some or all of computer executable instructions (alternatively referred to as "code") may be embodied in hardware or firmware (not shown). The microprocessor 103 may execute the instructions embodied by the software and code to perform various functions.

The network connections/communication link may include a local area network (LAN) and a wide area network (WAN or the Internet) and may also include other types of networks. When used in a WAN networking environment, the apparatus may include a modem or other means for establishing communications over the WAN or LAN. The modem and/or a LAN interface may connect to a network via an antenna. The antenna may be configured to operate over Bluetooth, wi-fi, cellular networks, or other suitable frequencies.

Any memory may be comprised of any suitable permanent storage technology—e.g., a hard drive or other non-transitory memory. The memory may store software including an operating system and any application(s) (such as an intelligent bot monitoring and IoT notification program and security protocols) along with any data needed for the operation of the apparatus and to allow bot monitoring and IoT device notification. The data may also be stored in cache memory, or any other suitable memory.

An input/output ("I/O") module 109 may include connectivity to a button and a display. The input/output module may also include one or more speakers for providing audio output and a video display device, such as an LED screen and/or touchscreen, for providing textual, audio, audiovisual, and/or graphical output.

In an embodiment of the computer 101, the microprocessor 103 may execute the instructions in all or some of the operating system 117, any applications 119 in the memory 115, any other code necessary to perform the functions in this disclosure, and any other code embodied in hardware or firmware (not shown).

In an embodiment, apparatus 100 may consist of multiple computers 101, along with other devices. A computer 101 may be a mobile computing device such as a smartphone or tablet.

Apparatus 100 may be connected to other systems, computers, servers, devices, and/or the Internet 131 via a local area network (LAN) interface 113.

Apparatus 100 may operate in a networked environment supporting connections to one or more remote computers and servers, such as terminals 141 and 151, including, in general, the Internet and "cloud". References to the "cloud" in this disclosure generally refer to the Internet, which is a world-wide network. "Cloud-based applications" generally refer to applications located on a server remote from a user, wherein some or all of the application data, logic, and instructions are located on the internet and are not located on a user's local device. Cloud-based applications may be accessed via any type of internet connection (e.g., cellular or wi-fi).

Terminals 141 and 151 may be personal computers, smart mobile devices, smartphones, IoT devices, or servers that include many or all of the elements described above relative to apparatus 100. The network connections depicted in FIG. 1 include a local area network (LAN) 125 and a wide area network (WAN) 129 but may also include other networks. Computer 101 may include a network interface controller (not shown), which may include a modem 127 and LAN interface or adapter 113, as well as other components and adapters (not shown). When used in a LAN networking environment, computer 101 is connected to LAN 125 through a LAN interface or adapter 113. When used in a WAN networking environment, computer 101 may include a modem 127 or other means for establishing communications over WAN 129, such as Internet 131. The modem 127 and/or LAN interface 113 may connect to a network via an antenna (not shown). The antenna may be configured to operate over Bluetooth, wi-fi, cellular networks, or other suitable frequencies.

It will be appreciated that the network connections shown are illustrative and other means of establishing a communications link between computers may be used. The existence of various well-known protocols such as TCP/IP, Ethernet, FTP, HTTP, and the like is presumed, and the system can be operated in a client-server configuration. The computer may transmit data to any other suitable computer system. The computer may also send computer-readable instructions, together with the data, to any suitable computer system. The computer-readable instructions may be to store the data in cache memory, the hard drive, secondary memory, or any other suitable memory.

Application program(s) 119 (which may be alternatively referred to herein as "plugins," "applications," or "apps") may include computer executable instructions for an intelligent bot monitoring and IoT notification program and security protocols, as well as other programs. In an embodiment, one or more programs, or aspects of a program, may use one or more AI/ML algorithm(s). The various tasks may be related to real-time bot monitoring and IoT device notification.

Computer 101 may also include various other components, such as a battery (not shown), speaker (not shown), a network interface controller (not shown), and/or antennas (not shown).

Terminal 151 and/or terminal 141 may be portable devices such as a laptop, cell phone, tablet, smartphone, server, or any other suitable device for receiving, storing, transmitting and/or displaying relevant information. Terminal 151 and/or terminal 141 may be other devices such as remote computers or servers. The terminals 151 and/or 141 may be computers where a user is interacting with an application.

Any information described above in connection with data 111, and any other suitable information, may be stored in memory 115. One or more of applications 119 may include one or more algorithms that may be used to implement features of the disclosure, and/or any other suitable tasks.

In various embodiments, the invention may be operational with numerous other general purpose or special purpose computing system environments or configurations. Examples of well-known computing systems, environments, and/or configurations that may be suitable for use with the invention in certain embodiments include, but are not limited to, personal computers, servers, hand-held or laptop devices, tablets, mobile phones, smart phones, other Computers, and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, IoT devices, and the like.

Aspects of the invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network, e.g., cloud-based applications. In a distributed computing environment, program modules may be located in both local and remote computer storage media including memory storage devices.

Figure 2:
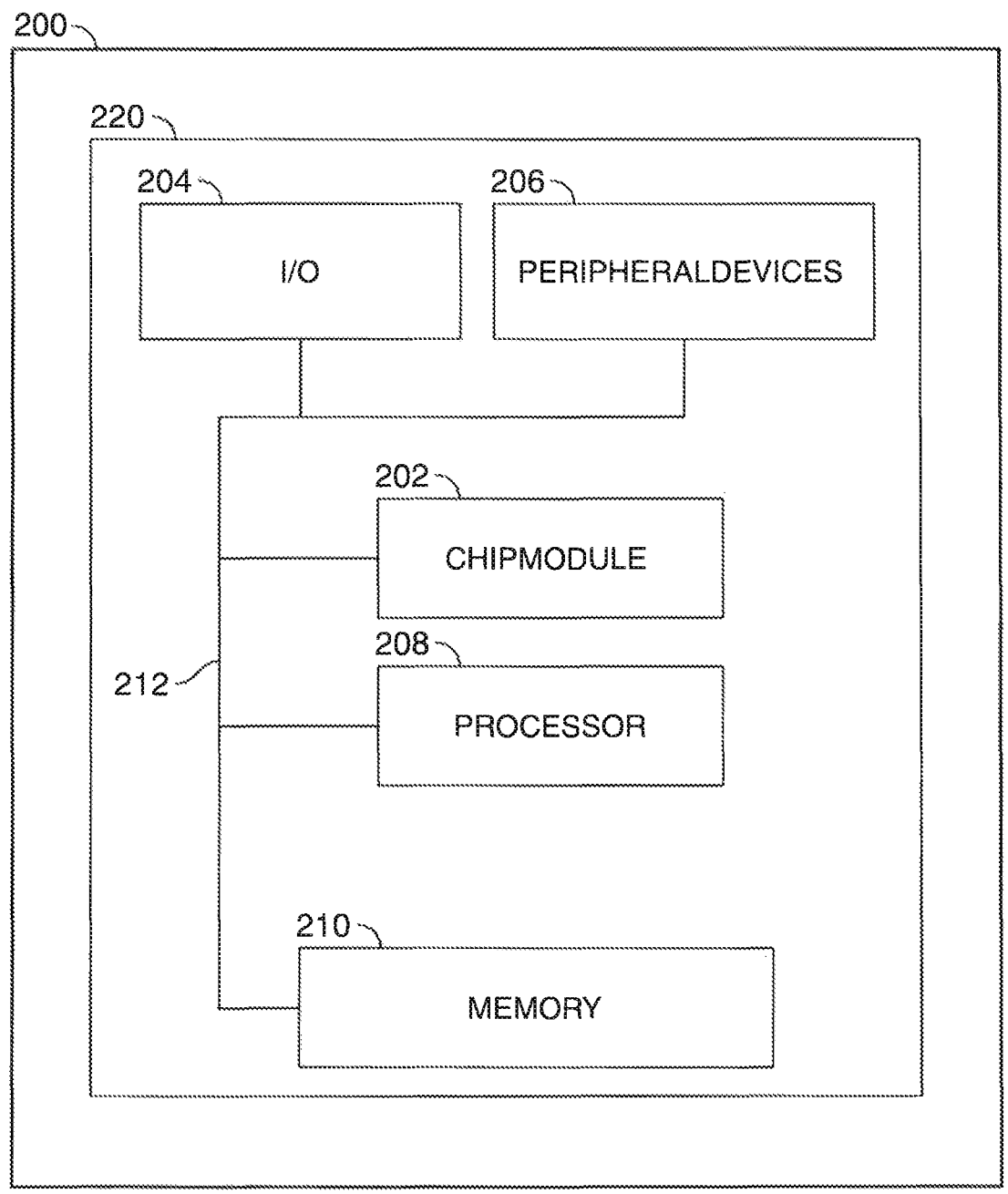
FIG. 2 shows an illustrative apparatus in accordance with principles of the disclosure.

FIG. 2 shows illustrative apparatus 200 that may be configured in accordance with the principles of the disclosure. Apparatus 200 may be a server or computer with various peripheral devices 206. Apparatus 200 may include one or more features of the apparatus shown in FIGS. 1, 3, and 6. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device, an display (LCD, LED, OLED, etc.), a touchscreen or any other suitable media or devices; peripheral devices 206, which may include other computers; logical processing device 208, which may compute data information and structural parameters of various applications; and machine-readable memory 210.

Machine-readable memory 210 may be configured to store in machine-readable data structures: machine executable instructions (which may be alternatively referred to herein as "computer instructions" or "computer code"), applications, signals, recorded data, and/or any other suitable information or data structures. The instructions and data may be encrypted.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
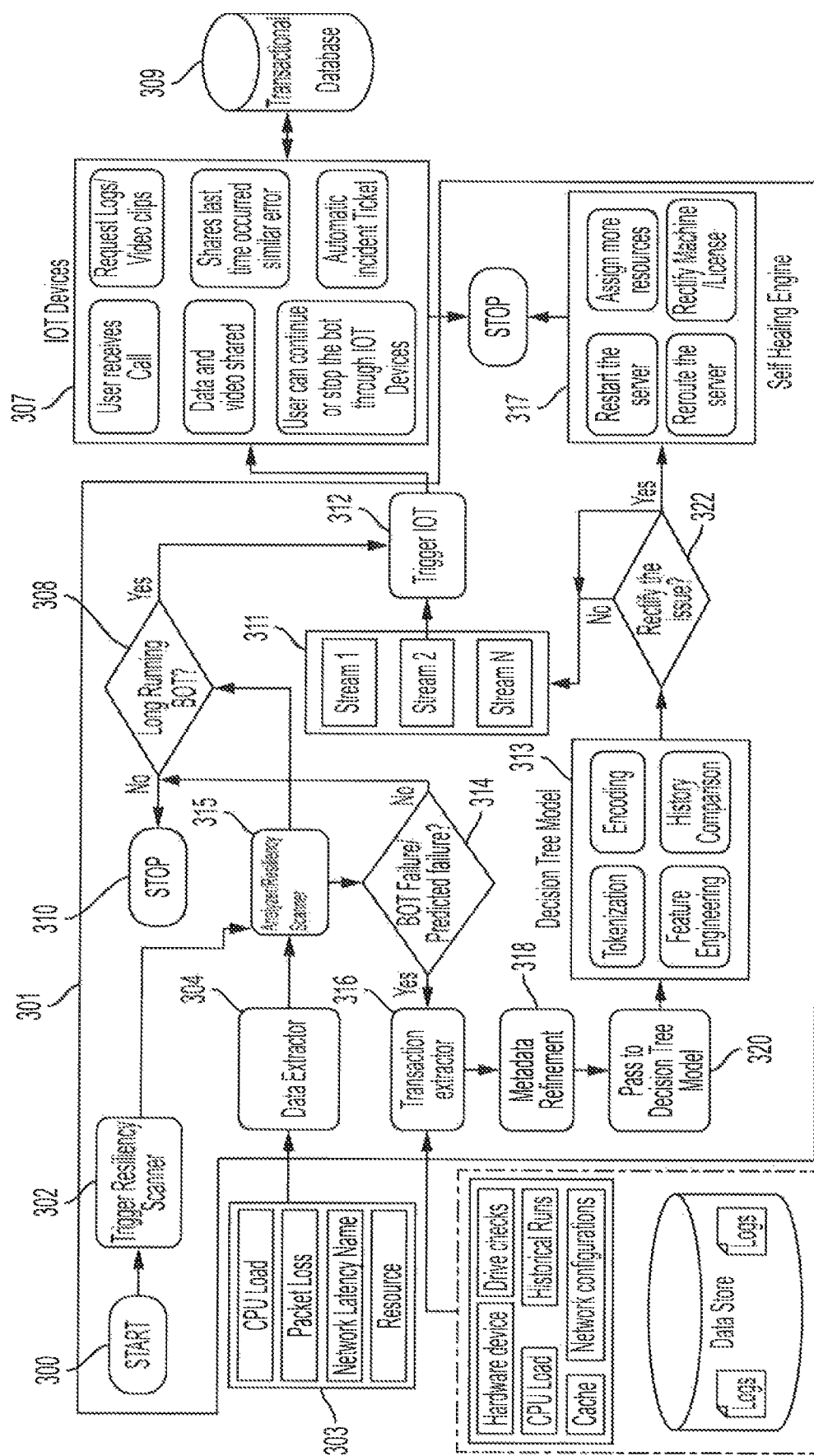
FIG. 3 shows an illustrative schematic in accordance with principles of the disclosure.

FIG. 3 shows an illustrative schematic in accordance with principles of the disclosure. Apparatus may include any of the components and systems odd-numbered 301 through 317, among other components. Methods may include some or all of the method steps even-numbered 302 through 322, as well as additional steps. Methods may include the steps illustrated in FIG. 3 in an order different from the illustrated order. The illustrative method shown in FIG. 3 may include one or more steps performed in other figures or described herein. Steps 302 through 306 may be performed on the apparatus shown in FIGS. 1-2, and 6 or other apparatus shown in other figures or described elsewhere.

The apparatus may include an intelligent real-time bot monitoring and notification computer program product 301. The computer program product 301 may include an analyzer 315 (e.g., a resiliency scanner module), a decision tree model 313, a self-healing engine 317, and may communicate through an event stream engine (which may include streams 1 through N) 311 with IoT devices 307. N may be the total number of IoT devices 307. IoT devices 307 may communicate with a database 309. The database 309 may be a distributed ledger.

A user (not shown) may receive the notification through IoT device 307. The user may view a video included with the notification. The user may request logs or other information. The other information may include historical instances of the same or similar failures, which may be sourced through database 309. The user may be able to respond to the notification and stop the bot or take other actions through IoT device 307. The IoT device 307, or program 301, may create an automatic incident ticket or log of the failure and any other action. This ticket may be stored in database 309 or elsewhere.

Program product 301 may communicate with one or more bots 303. Bots 303 may provide data such as CPU load, packet loss, network latency, resource use, and other information. Program product 301 may also communicate with database 305. Database 305 may include historical data, hardware/device information, logs, network configurations, and other information.

At step 300 computer program product 301 may start. At step 302, the resiliency scanner/analyzer 315 may be started or triggered by the program 301. At step 304, the resiliency scanner/analyzer 315 may receive configuration and other data from bots 303. At step 308, the analyzer 315 may determine if the bot 303 is exceeding a typical runtime (or completing its process too quickly). If the answer is no, at step 310, that time check will cease. If the answer is yes, at step 312, the program 301 may trigger one or more IoT devices 307 through the event stream engine 311.

At step 314, the program 301, through analyzer 315 may determine if there is a bot failure or predicted bot failure expected. If no, the program 301 may cease this check as shown at step 310. If yes, at step 316, the analyzer 315 may receive information from bot 303 as well as database 305 regarding historical data. At step 318, the metadata from bot 303 and database 305 may be refined. At step 320, the analyzer 315 may pass the information to a decision tree model 313. The decision tree model 313 may determine if the failure can be rectified through self-healing engine 317 at step 322. If yes, the data may be transmitted to the self-healing engine 317 as well as transmitted to event-stream engine 311 (for notification to IoT device 307). If no, the decision tree model may notify the user through event stream engine 311 and IoT device 307.

The decision tree model 313 may tokenize the data, encode the data, compare historical records (including historical repairs) with the failure, as well as other information to determine if a repair is possible.

Self-healing engine 317 may restart the server, restart the bot, reroute the bot, assign more resources, rectify configuration and license issues, as well as perform other repairs as appropriate. In an embodiment, when the self-healing engine 317 is successful, the event-stream engine 311 may not notify the user through IoT device 307.

Figure 4:
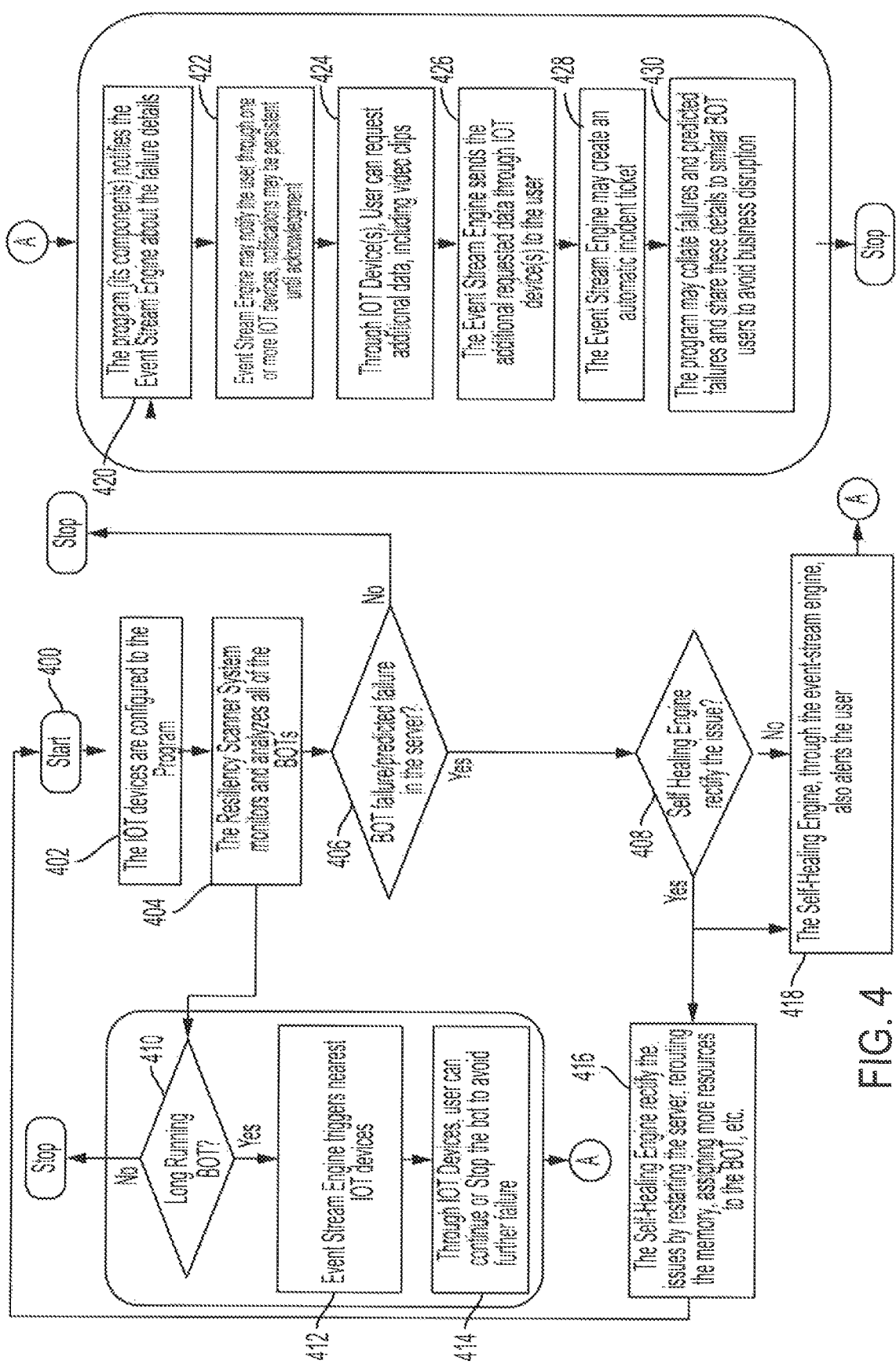
FIG. 4 shows an illustrative flowchart in accordance with principles of the disclosure.

FIG. 4 shows an illustrative flowchart in accordance with principles of the disclosure. Methods may include some or all of the method steps numbered 400 through 430. Methods may include the steps illustrated in FIG. 4 in an order different from the illustrated order. The illustrative method shown in FIG. 4 may include one or more steps performed in other figures or described herein. Steps 400 through 430 may be performed on the apparatus shown in FIGS. 1-3, 6 or other apparatus. (Step (A) may refer to steps within the box labeled (A): steps 420-430).

The method may begin at step 400. At step 402, a user's IoT devices (smartphone, smart watch, speakers, doorbells, smart clothing, etc.) may be configured to a real-time bot monitoring and notification computer program. At step 404, a resiliency scanner module may monitor and analyze one or more bots, including their execution and processes.

At step 406, the resiliency scanner module may determine if there is a bot failure or predicted failure. If no, the program may stop. If yes, at step 408, the program may assign a self-healing engine to attempt to correct the failure or predicted failure. If the self-healing engine can fix the issue(s) at step 416, the program may then continue monitoring and return to step 400. In an embodiment, even when the self-healing engine repairs the issue, the self-healing engine will notify the user of the issue at step 418. If the self-healing engine cannot repair the issue(s), at step 418, the program may use the even-stream engine (through steps 420-430, labeled (A)) to notify the user of the issue(s) as well as past, historical, similar issues.

At step 410, the resiliency scanner may determine if a particular bot is running too long (or too short). If no, the program may stop scanning for that issue. If yes, at step 412, an event stream engine module of the program may be triggered. The event-stream engine may determine the nearest IoT devices to a user and transmit a notification to the IoT device. The user, at step 414 may transmit an action, such as stopping the bot, to the server to avoid further failure. Further report(s) may be transmitted to the user through the steps labeled (A): steps 420-430.

At step 422, the event-stream engine may persistently notify the user through a nearby IoT device, through text, voice, mobile push, or other notification method until the user acknowledges the notification.

At step 424, the user, through one or more IoT devices, can request failure logs and video clips, along with other information.

At step 426, the event-stream engine may transmit the requested information to the user.

At step 428, the event-stream engine may create an automatic incident ticket and log the ticket in an appropriate location (on a server, through email, etc.).

At step 430, the resiliency scanner module or other program module may share details of the incident ticket with other administrators or users to prevent repeated issues with the same bot or similar bots.

Figure 5:
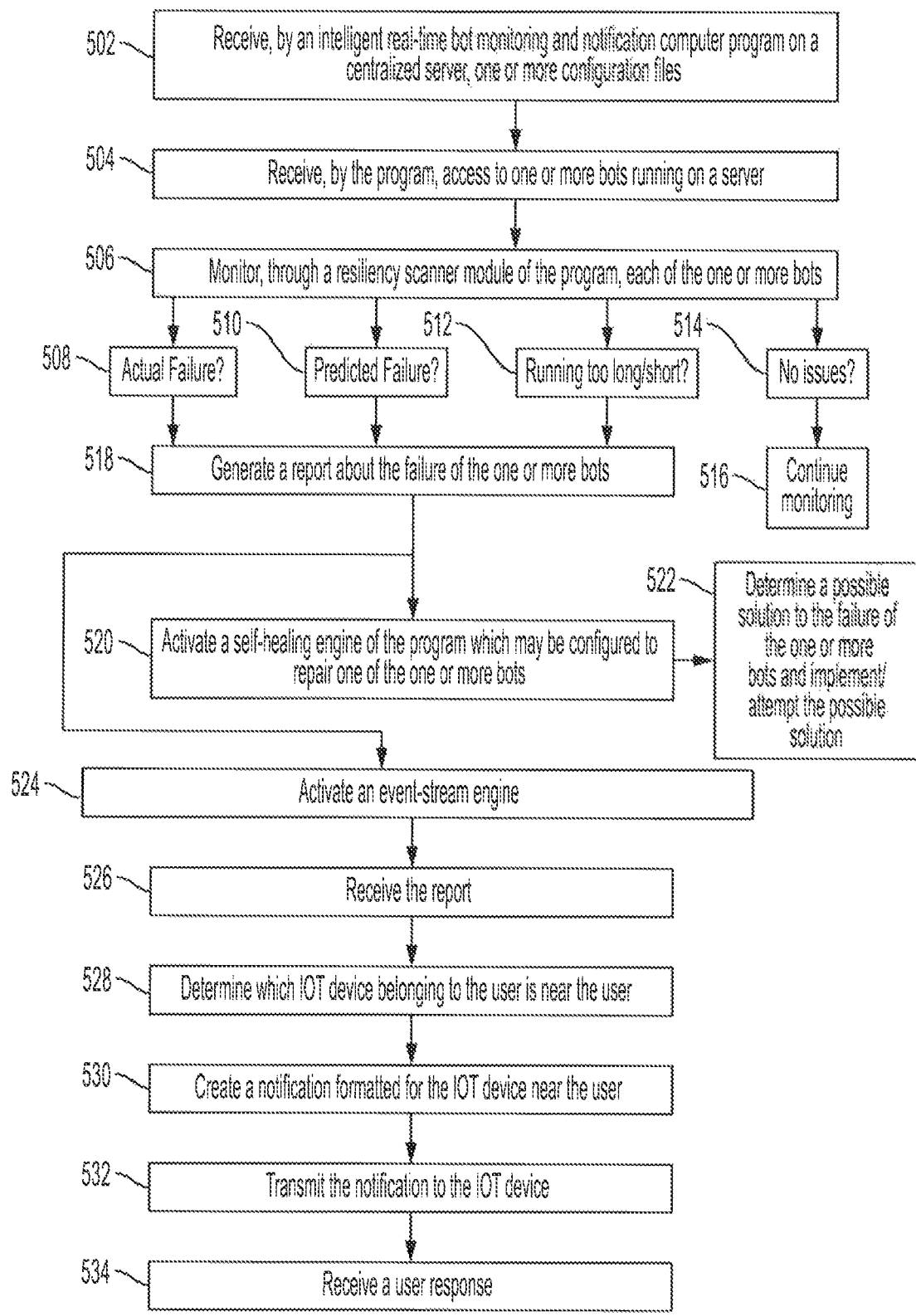
FIG. 5 shows an illustrative flowchart in accordance with principles of the disclosure.

FIG. 5 shows an illustrative flowchart in accordance with principles of the disclosure. Methods may include some or all of the method steps numbered 502 through 534. Methods may include the steps illustrated in FIG. 5 in an order different from the illustrated order. The illustrative method shown in FIG. 5 may include one or more steps performed in other figures or described herein. Steps 502 through 522 may be performed on the apparatus shown in FIGS. 1-3, 6 or other apparatus.

At step 502, an intelligent real time bot monitoring and notification computer program on a centralized server may receive one or more configuration files. The configuration files may inform and allow the computer program to communicate with one or more IoT devices belonging to a user.

At step 504, the program may receive access to one or more bots running on a server. The server may be the same centralized server as the program, or a different server.

At step 506, the program may monitor, through a resiliency scanner module, each of the one or more bots, in real-time and continuously.

At steps 508, the scanner module may determine if the bot is suffering from an actual failure. At step 510, the scanner module will determine if a failure will occur in the future (i.e., predict a failure). At step 512, the scanner module will determine if the bot is executing its processes too quickly or too slowly.

At step 514, the scanner module may also determine if the there are no issues with the bot.

If there are no issues, at steps 508-514, at step 516, the scanner module may continue monitoring each of the bots.

If there is an issue at steps 508-512, at step 518 the program may generate a report about the failure of whichever bot has failed or is predicted to fail.

At step 520, the program may activate a self-healing engine which may be configured to attempt a repair of whichever bot has failed.

At step 524, the program may also activate an event-stream engine to report the failure to a user through an IoT device.

The event stream engine may receive the report at step 526, and determine which IoT device from the configuration files received at step 502 belonging to the user is near the user at the time at step 528.

At step 530, the event-stream engine may create a notification formatted for the IoT device near the user. And, at step 532, the event-stream engine may transmit the notification to the IoT device. At step 534, the event-stream engine or the program may receive a response or acknowledgment from the user.

Figure 6:
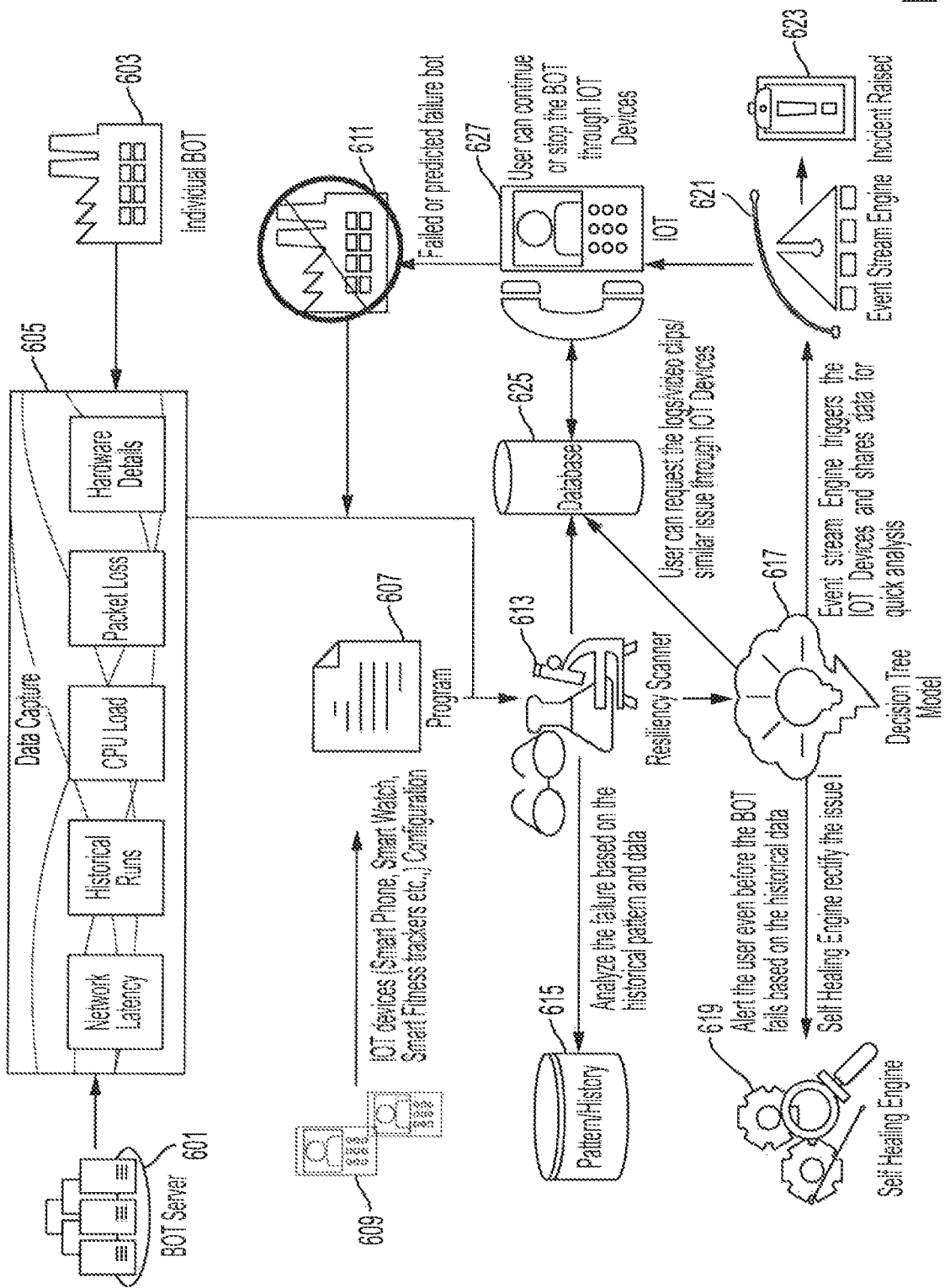
FIG. 6 shows an illustrative apparatus in accordance with principles of the disclosure.

FIG. 6 shows an illustrative apparatus in accordance with principles of the disclosure.

A bot server 601 may include one or more individual bots 603. Data 605, including metadata, network latency, historical data, CPU load data, packet loss data, hardware details, network data, and other information may be captured by a real-time bot monitoring and notification computer program 607. The data 605 may be specific to each bot and specific to each server.

IoT devices 609 may be configured to communicate with program 607. These devices 609 may be all of the IoT devices belonging to a user. The user may register each of these devices at one time or multiple times with the program 607. The registration of each device may include supplying configuration files and other data so that the program 607 can communicate with each device 609, as well as determine which device to activate through the event stream engine 621 at the appropriate time.

The program 607 may include a resiliency scanner module 613, a decision tree model 617, a self-healing engine 619, an event-stream engine 621, and may communicate with one or more databases, including database 615 and database 625.

When the program detects a bot exceeding its expected runtime or finishing its process(es) too quickly, or other failure as described herein, a user may be notified by the event stream engine 621 through a nearby IoT device 627. The event-stream engine 621, or other component of program 607, may determine which IoT device 627 (out of the group of IoT devices 609) is near the user through various methods, including determining the time and comparing the time to historical usage of the IoT devices 609. The event-stream engine may also create an incident ticket 623.

Thus, apparatus and methods for intelligently monitoring, in real-time, one or more bots and notifying a user through IoT device(s) are provided. Persons skilled in the art will appreciate that the present invention can be practiced by other than the described embodiments, which are presented for purposes of illustration rather than of limitation.

What is claimed is:

1. An intelligent real-time bot monitoring and notification computer program product, the computer program product comprising executable instructions, the executable instructions when executed by a processor on a computer system:
   receive one or more configuration files, wherein each configuration file comprises instructions to communicate with an Internet-of-Things ("IoT") device belonging to a user;
   receive access to one or more bots running on a server;
   monitor, through a resiliency scanner module, each of the one or more bots; and
   when the computer program product detects that one of the one or more bots has failed:
      generate a report about the failure of the one of the one or more bots;
      activate a self-healing engine configured to repair the one of the one or more bots, wherein the self-healing engine determines, through one or more artificial intelligence/machine learning ("AI/ML") algorithms, a possible repair to the failure of the one of the one or more bots; and
      activate an event-stream engine, wherein the event-stream engine:
         receives the report;
         automatically determines which IoT device belonging to the user is proximate to the user by analyzing the one or more configuration files;
         determines a correct format for a notification to the IoT device determined to be proximate to the user by searching the Internet;
         creates the notification formatted for the IoT device determined to be proximate to the user;
         transmits the notification to the IoT device;
         when the user does not acknowledge an initial notification, re-transmits the notification at pre-determined intervals; and
         when the user does not acknowledge one or more subsequent notifications within a pre-determined time period:
            determines that a different IoT device is proximate to the user;
            determines a correct format for a notification to the different IoT device by searching the Internet;
            creates the notification formatted for the different IoT device; and
            transmits the notification to the different IoT device.

2. The intelligent real-time bot monitoring and notification computer program product of claim 1 wherein when the computer program product determines that one of the one or more bots is exceeding an expected runtime, the instructions:
   generate a report about the expected runtime of the one of the one or more bots;
   activate the self-healing engine, wherein the self-healing engine determines, through one or more AI/ML algorithms, a possible solution to the one of the one or more bots exceeding its expected runtime; and
   activate the event-stream engine, wherein the event-stream engine:
      receives the report;
      determines which IoT device belonging to the user is proximate to the user;
      creates a notification formatted for the IoT device proximate to the user; and
      transmits the notification to the IoT device.

3. The intelligent real-time bot monitoring and notification computer program product of claim 1 wherein, when the computer program product determines that one of the one or more bots is performing as expected, the instructions continue monitoring the one of the one or more bots.

4. The intelligent real-time bot monitoring and notification computer program product of claim 1 wherein the resiliency scanner module predicts, through one or more AI/ML algorithms, that one of the one or more bots will experience a predicted failure.

5. The intelligent real-time bot monitoring and notification computer program product of claim 4 wherein, when the resiliency scanner module predicts that one of the one or more bots will experience a predicted failure, the instructions:
   generate a report about the predicted failure;
   activate the self-healing engine, wherein the self-healing engine determines through one or more AI/ML algorithms, a possible solution to the predicted failure of the one of the one or more bots; and
   activate the event-stream engine, wherein the event-stream engine:
      receives the report;
      determines which IoT device belonging to the user is proximate to the user;
      creates a notification formatted for the IoT device proximate to the user; and
      transmits the notification to the IoT device.

6. The intelligent real-time bot monitoring and notification computer program product of claim 1 wherein the user responds to the notification by providing a user response.

7. The intelligent real-time bot monitoring and notification computer program product of claim 6 wherein the user responds to the notification by providing the user response through the IoT device or through a different device.

8. The intelligent real-time bot monitoring and notification computer program product of claim 6 wherein the user responds to the notification by instructing the program to:
   1) Terminate the one of the one or more bots;
   2) Restart the one of the one or more bots;
   3) Restart the server;

4) Start a different bot; or
5) A combination of two or more of 1)-4).

9. The intelligent real-time bot monitoring and notification computer program product of claim 6 wherein the instructions log and record the user response.

10. The intelligent real-time bot monitoring and notification computer program product of claim 1 wherein the notification includes one or more videos.

11. The intelligent real-time bot monitoring and notification computer program product of claim 1 wherein the notification includes one or more log reports.

12. The intelligent real-time bot monitoring and notification computer program product of claim 1 wherein the event-stream engine creates and records an incident ticket.

13. An apparatus for intelligent real-time bot monitoring and notification, the apparatus comprising:
 a central server, the central server including:
  a communication link;
  a processor;
  a non-transitory memory configured to store at least:
   an operating system; and
   a real-time bot monitoring and notification application; and
 one or more Internet-of-Things ("IoT") devices belonging to a user, each IoT device including an IoT communication link;
wherein the application includes:
 a resiliency scanner module configured to monitor one or more bots for failure;
 a self-healing engine configured to:
  determine, through one or more artificial intelligence/machine learning ("AI/ML") algorithms, a possible repair to a failure of one of the one or more bots; and
  apply the possible repair to the one of the one or more bots; and
 an event-stream engine configured to:
  determine which one of the one or more IoT devices belonging to the user is proximate to the user when the resiliency scanner module determines that one of the one or more bots has failed;
  determine a correct format for a notification to the IoT device proximate to the user by searching the Internet;
  create the notification formatted for the proximate IoT device;
  transmit the notification to the IoT device;
  when the user does not acknowledge an initial notification, re-transmit the notification at pre-determined intervals; and
  when the user does not acknowledge one or more subsequent notifications within a pre-determined time period:
   determine that a different IoT device is proximate to the user;
   determine a correct format for a notification to the different IoT device by searching the Internet;
   create the notification formatted for the different IoT device; and
   transmit the notification to the different IoT device.

14. The apparatus of claim 13 wherein the failure includes the one of the one or more bots exceeding an expected runtime.

15. The apparatus of claim 13 wherein the failure includes the resiliency scanner module predicting, through one or more AI/ML algorithms, that one of the one or more bots will fail at a particular time.

16. The apparatus of claim 13 wherein the user responds to the notification through the proximate IoT device.

17. A method for intelligent real-time bot monitoring and notification, the method comprising the steps of:
 receiving, by an intelligent real-time bot monitoring and notification computer program on a centralized server, one or more configuration files, wherein each configuration file comprises instructions to communicate with an Internet-of-Things ("IoT") device belonging to a user;
 receiving, by the program, access to one or more bots running on the server;
 monitoring, through a resiliency scanner module of the program, each of the one or more bots; and
 when the program detects that one of the one or more bots has failed:
  generating a report about the failure of the one or more bots;
  activating a self-healing engine of the program configured to repair the one of the one or more bots, wherein the self-healing engine determines, through one or more artificial intelligence/machine learning ("AI/ML") algorithms, a possible solution to the failure of the one of the one or more bots; and
  activating an event-stream engine of the program, wherein the event-stream engine:
   receives the report;
   determines which IoT device belonging to the user is proximate to the user by analyzing the one or more configuration files;
   determines a correct format for a notification to the IoT device proximate to the user by searching the Internet;
   creates the notification formatted for the IoT device proximate to the user; and
   transmits the notification to the IoT device
   when the user does not acknowledge an initial notification, re-transmits the notification at pre-determined intervals; and
   when the user does not acknowledge one or more subsequent notifications within a pre-determined time period:
    determines that a different IoT device is proximate to the user;
    determines a correct format for a notification to the different IoT device by searching the Internet;
    creates the notification formatted for the different IoT device; and
    transmits the notification to the different IoT device.

18. The method of claim 17 wherein the user is a system administrator.

19. The method of claim 17 wherein the failure of the one of the one or more bots includes:
 1) The one of the one or more bots exceeding an expected runtime;
 2) The resiliency scanner module predicting, through one or more AI/ML algorithms, that one of the one or more bots will fail at a particular time;
 3) The one of the one or more bots ceasing to function in an expected manner; or
 4) A combination of two or more of 1)-3).

* * * * *